(12) United States Patent
Jeon et al.

(10) Patent No.: US 9,024,587 B2
(45) Date of Patent: May 5, 2015

(54) BATTERY SYSTEM FOR PROTECTING BATTERY MANAGEMENT SYSTEM FROM ELECTROMAGNETIC WAVES

(75) Inventors: Yoon Cheol Jeon, Gyeonggi-do (KR); Hae Kyu Lim, Gyeonggi-do (KR); Yong Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 465 days.

(21) Appl. No.: 13/494,516

(22) Filed: Jun. 12, 2012

(65) Prior Publication Data
US 2013/0099752 A1    Apr. 25, 2013

(30) Foreign Application Priority Data

Oct. 25, 2011    (KR) .................. 10-2011-0109384

(51) Int. Cl.
*H02J 7/00*    (2006.01)
*H01M 2/10*    (2006.01)
*H01M 10/42*   (2006.01)
*H01M 10/48*   (2006.01)

(52) U.S. Cl.
CPC .......... *H01M 2/1077* (2013.01); *H01M 10/425* (2013.01); *H01M 10/482* (2013.01)

(58) Field of Classification Search
CPC ...................................... Y02E 60/12
USPC ....................................... 320/132
See application file for complete search history.

(56) References Cited

U.S. PATENT DOCUMENTS

| | | | | |
|---|---|---|---|---|
| 6,441,586 B1* | 8/2002 | Tate et al. | ...... | 320/132 |
| 6,504,344 B1* | 1/2003 | Adams et al. | ...... | 320/132 |
| 7,768,233 B2* | 8/2010 | Lin et al. | ...... | 320/132 |
| 8,305,034 B2* | 11/2012 | Rubio | ...... | 320/105 |
| 8,476,865 B2* | 7/2013 | Iwanaga et al. | ...... | 320/104 |
| 8,587,255 B2* | 11/2013 | Parakulam et al. | ...... | 320/132 |
| 2007/0090798 A1* | 4/2007 | Yun et al. | ...... | 320/116 |
| 2007/0159137 A1* | 7/2007 | Verbrugge et al. | ...... | 320/132 |
| 2009/0111015 A1* | 4/2009 | Wood et al. | ...... | 429/164 |
| 2010/0141214 A1* | 6/2010 | Yoon et al. | ...... | 320/134 |
| 2011/0193518 A1* | 8/2011 | Wright et al. | ...... | 320/101 |
| 2011/0291606 A1* | 12/2011 | Lee | ...... | 320/101 |
| 2013/0113429 A1* | 5/2013 | Kim et al. | ...... | 320/128 |
| 2014/0125290 A1* | 5/2014 | Kim et al. | ...... | 320/135 |

FOREIGN PATENT DOCUMENTS

| | | | |
|---|---|---|---|
| JP | 2004-142593 A | 5/2004 | |
| JP | 2009-083599 A | 4/2009 | |

(Continued)

*Primary Examiner* — Suresh Memula
(74) *Attorney, Agent, or Firm* — Mintz Levin Cohn Ferris Glovsky and Popeo, P.C.; Peter F. Corless

(57) ABSTRACT

Disclosed is a system for protecting a BMS from electromagnetic waves, and more particularly, to a system for protecting a BMS from electromagnetic waves to prevent voltage sensing errors due to the electromagnetic waves generated by current from a battery cell. The system includes: a battery having a plurality of battery cells; a power relay assembly intermittently charging and discharging the battery; a battery management system (BMS) connected to the battery cell via a voltage sensing wire to predict a battery's SOC; and a housing surrounding the battery and the power relay assembly with one side of the outside of the housing having a separate section for therein for receiving the BMS so as to partition the BMS and the battery in different spaces.

5 Claims, 2 Drawing Sheets

(56) References Cited

FOREIGN PATENT DOCUMENTS

| KR | 10-2007-0112489 | | 11/2007 |
|----|-----------------|---|---------|
| KR | 10-2007-0112489 | A | 11/2007 |
| KR | 10-2009-0010426 | A | 1/2009 |
| KR | 10-2009-0052802 | A | 5/2009 |

* cited by examiner

BATTERY SYSTEM FOR PROTECTING BATTERY MANAGEMENT SYSTEM FROM ELECTROMAGNETIC WAVES

This application claims under 35 U.S.C. §119(a) the benefit of Korean Patent Application No. 10-2011-0109384 filed on Oct. 25, 2011, the entire contents of which are incorporated herein by reference.

BACKGROUND (a) Technical Field

The present invention relates to a battery system for protecting a battery management system from an electromagnetic wave of a battery cell, and more particularly, to a battery system that prevents voltage sensing errors in the battery management system caused due to an electromagnetic wave generated by current in a battery cell by protecting the battery management system from the electromagnetic waves generated by one or more battery cells.

(b) Background Art

Generally, in vehicle battery systems such as a hybrid vehicle (HEV), a plug-in hybrid vehicle (PHEV), an electric vehicle (EV), or the like, a high-voltage battery is one of the main factors in determining the quality of vehicle since vehicle uses a large amount of current during operation as a power source from this high voltage battery. Thus, controlling these battery systems are a significant factor as well in design a quality product that consumers can rely on.

In a conventional battery system, a battery management system (BMS) collectively manages and controls the entire state of the battery. Accordingly, the BMS operates similar to a control unit. More specifically, the BMS provides information to a hybrid control unit (HCU) of a vehicle. The HCU performs an integrated control of the vehicle by measuring voltage of each battery cell from the state of charge (SOC) information related to the battery, thereby providing power generation control and operational control for the vehicle's overall control system.

The battery SOC is represented by a percentage of present potential capacity compared to available maximum capacity of the battery and residual capacity of the battery means amount of electricity (available discharge amount) remaining in the battery while current is charged and discharged in and out of the battery.

As shown in FIG. 1, in the battery system according to the conventional art, a battery cell 200, a power relay assembly (PRA) 300, and a BMS 400, or the like, are included within an external cover 100. In this configuration, however, voltage sensing errors may occur in the BMS 400 due to the influence of an electromagnetic wave generated by high current from the battery cell 200. In particular, when the voltage sensing errors occur during operation of, for instance an electric vehicle, the vehicle may stall thereby stranding its passengers.

SUMMARY OF THE DISCLOSURE

The present invention has been made in an effort to provide a battery system for protecting a battery management system (BMS) from electromagnetic waves generated by one or more battery cells to prevent voltage sensing errors within the BMS by forming a shielding structure between the battery cell and the BMS.

In one exemplary embodiment of the present invention, a battery system for protecting a BMS from electrochemical waves generated by one or more battery cells includes: a battery including a plurality of battery cells; a power relay assembly intermittingly charging and discharging of the battery; a BMS connected to the battery cell via a voltage sensing wire to predict a battery SOC; and a housing surrounding the battery and the power relay assembly, wherein one side of the outside of the housing provides a separate section for the BMS to separate the BMS and the battery within the housing itself.

Furthermore, this separate section for the BMS may include a BMS seating groove that is configured to seat and receive the BMS therein. The BMS may be formed so as not to be protruded from a surface of the housing (i.e. so that the outer surface of the BMS is aligned along the same planar surface as the one side of the outside of the housing), when the BMS is seated within the BMS seating groove. The BMS seating groove may be provided with one or more wire apertures through which the voltage sensing wires penetrate therethrough. The wire aperture may be formed on at least one side of the BMS seating groove.

BRIEF DESCRIPTION OF THE DRAWINGS

The above and other features of the present invention will now be described in detail with reference to certain preferred embodiments thereof illustrated in the accompanying drawings which are given hereinbelow by way of illustration only, and thus are not limitative of the present invention, and wherein.

Figure 1:
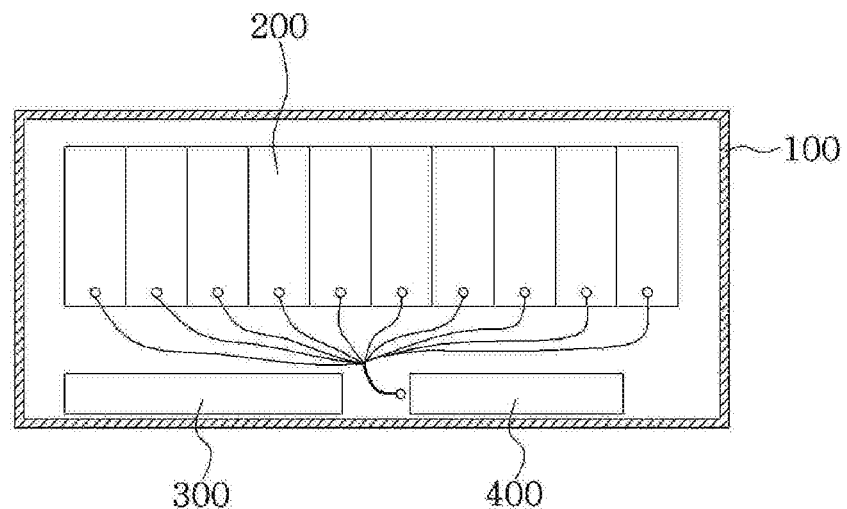
FIG. 1 is a cross-sectional view showing a battery system according to the conventional art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
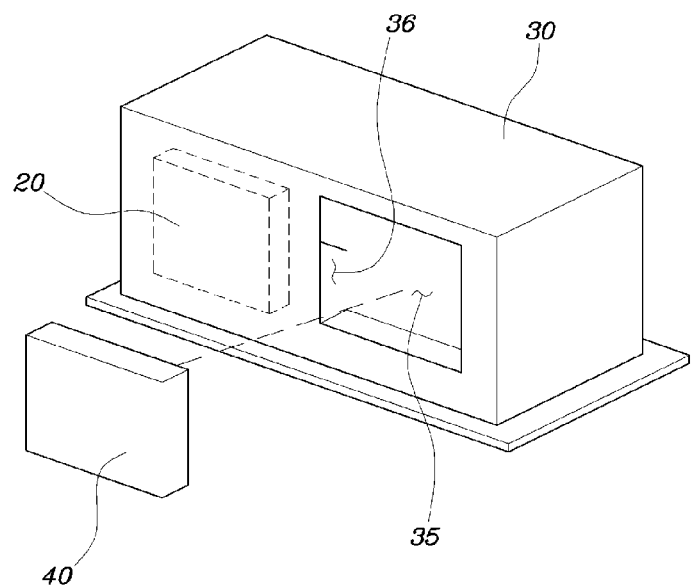
FIG. 2 is a perspective view showing a battery system for protecting a BMS from an electromagnetic wave generated by one or more battery cells according to an exemplary embodiment of the present invention.
Figure 3:
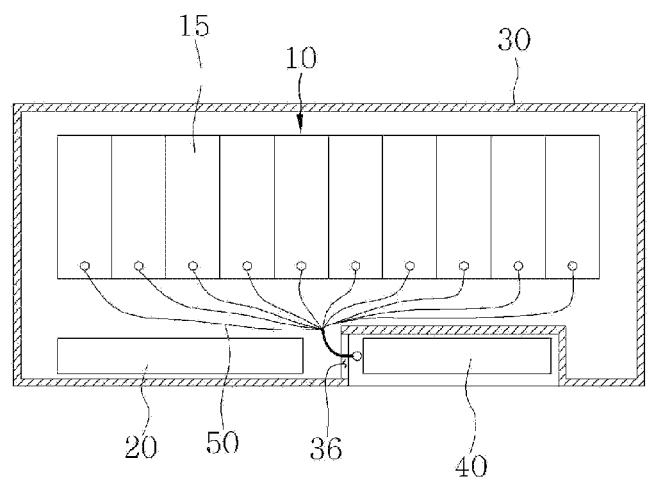
FIG. 3 is a cross-sectional view showing the battery system for protecting a BMS from the electromagnetic wave generated by one or more battery cells cell according to the exemplary embodiment of the present invention.

The battery system for protecting a BMS from an electromagnetic wave generated by one or more battery cells according to an exemplary embodiment of the present invention prevents voltage sensing errors of BMS due to an electromagnetic waves generated by current from the battery cell. As shown in FIGS. 2 and 3, the battery system may be configured to include a battery 10 including a plurality of battery cells 15, a power relay assembly 20 intermittingly charging and discharging the battery 10, and a BMS 40 connected to the battery cell 15 via the voltage sensing wire 50 to predict a battery's SOC. The battery system further includes a housing 30 surrounds the battery 10 and the power relay assembly 20. On one side of the outside of the housing 30 the BMS 40 is seated within a separate section of the housing so as to partition or separate the BMS 40 and the battery 10 into different spaces within the same housing 30.

As stated above, the battery 10 is configured of the plurality of battery cells 15 that can be charged and discharged and are formed as a single pack, which is used as a main power source of a vehicle.

In addition, the power relay assembly 20, which is disposed so as to intermittently charging and discharging of the battery 10, includes a first main relay (not shown) connected to an anode side of the battery 10 and a second main relay (not shown) connected to a cathode side. The first and second main relays are controlled by being turned-on/off by the BMS 40 to be described below. More specifically, the charging or discharging of the battery 10 is performed by determining the temperature of the battery 10 and permitting the BMS 40 to operate the first and second main relays.

Further, the BMS 40 is connected to each battery cell 15 via a separate voltage sensing wire 50 and measures the voltage of the battery 10 via voltage sensing wires 50 to calculate the SOC of the battery, the maximally available charge power $P_{in}$, discharge power $P_{out}$, or the like and transmit the calculated values to a separate vehicle control unit (not shown).

In addition, the housing 30 surrounding the battery 10 and the power relay assembly 20 surround the battery 10 and the power relay assembly 20 to protect them from external impact and vibrations. However, the inside of the housing 30 may also include a plurality of individual a cell cover (not shown) that individually protect each of the battery cells 15.

In this configuration, one side of the outside of the housing 30 includes a partitioned section which is configured to receive the BMS 40 so as to dispose the BMS 40 and the battery 10 in different sections of the housing integrally. In other words, one side of the outside of the housing 30 receives with the BMS 40 within a separate partitioned section formed into the side of the housing so that the BMS 40 is not affected by the electromagnetic wave due to current generated from the battery 10. That is, the housing 30 is configured to provide a shield for the BMS 40 from the electromagnetic wave generated from the battery 10 while at the same time protecting the battery 10 and the power relay assembly 20 from the external impact and vibration.

In addition, one side of the outside of the housing 30 receiving the BMS 40 may also be provided with a BMS seating groove 35 (i.e., the separate section that receives the BMS 40) that is configured to receive and seat the BMS 40 and when the BMS seating groove 35. In doing so the BMS 40 is inserted into the one side of the housing until the all but one side of the BMS are surrounded by the housing and an outer side is disposed along the same plane as the one side of the housing itself. That is, BMS 40 does not protrude from a surface of the housing 30. Rather, the housing receives the BMS as shown in FIG. 3.

In other words, one side of the outside of the housing 30 is provided with the BMS seating groove 35 to which the BMS 40 is seated. The BMS seating groove 35 does not protrude from the housing 30 thereby preventing the BMS 40 from being damaged.

Furthermore, the BMS seating groove 35 may be provided with wire apertures 36 through which the voltage sensing wires 50 pass through to reach the battery cells 15. That is, one side of the BMS seating groove 35 is provided with the wire apertures 36 and the voltage sensing wires 50 is connected to each of the battery cells 15 by penetrating through the wire apertures 36. In this case, as shown in FIG. 2 or 3, the wire aperture 36 is formed on the side of the BMS seating groove 35 that best prevents the BMS 40 from being exposed to the electromagnetic wave through the wire apertures 36.

Referring again to the battery system for protecting the BMS from the electromagnetic waves generated by one or more battery cells of the battery system of the to present invention, the voltage sensing errors of the BMS 40 may be prevented by mounting the housing 30 to dispose the BMS 40 within a separate section on one side of the outside of the housing by protecting the BMS 40 from the electromagnetic wave generated by the high current from the battery cell 15 while protecting the battery configured with a plurality of battery cells 15 and the power relay assembly 20 from the external impact, or the like.

As set forth above, the exemplary embodiments of the present invention can prevent the voltage sensing errors of the BMS by protecting the BMS from the electromagnetic wave generated by the high current from the battery cell.

Furthermore, the battery system for preventing a BMS according to the exemplary embodiment of the present invention describes the detailed exemplary embodiment and the accompanying drawings as described above. However, it will be appreciated by those skilled in the art that changes may be made in these embodiments without departing from the principles and spirit of the invention, the scope of which is defined in the appended claims and their equivalents.

What is claimed is:

1. A battery system for protecting a battery management system (BMS) from the electromagnetic waves generated by one or more battery cells of the battery system, comprising:
   a battery including a plurality of battery cells;
   a power relay assembly intermittently charging and discharging the battery;
   the BMS connected to the battery cell via a voltage sensing wire to predict a battery's state of charge (SOC); and
   a housing surrounding the battery and the power relay assembly, the housing including a separate section configured to receive within the housing BMS,
   wherein one side of the outside of the housing is configured to receive, within the separate section of the housing, the BMS to partition the BMS from the battery and the power relay,
   wherein the one side of the outside of the housing configured to receive the BMS is provided with a BMS seating groove configured to receive and seat the BMS therein, the BMS seating groove formed into the one side of the outside of the housing, and wherein once BMS is received within the BMS seating groove, the BMS does not protrude from a surface of the housing.

2. The battery system of claim 1, wherein the BMS seating groove includes one or more wire apertures through which the voltage sensing wires pass through to the battery.

3. The battery system of claim 2, wherein the wire aperture is formed on a side wall of the BMS seating groove.

4. The battery system of claim 1, wherein the BMS seating groove is formed with the wire apertures through which the voltage sensing wires pass through.

5. The battery system of claim 4, wherein the wire apertures are formed on a side wall of the BMS seating groove.

* * * * *